L. J. ALDRIDGE.
JOURNAL BEARING.
APPLICATION FILED OCT. 27, 1908.
927,471.
Patented July 13, 1909.
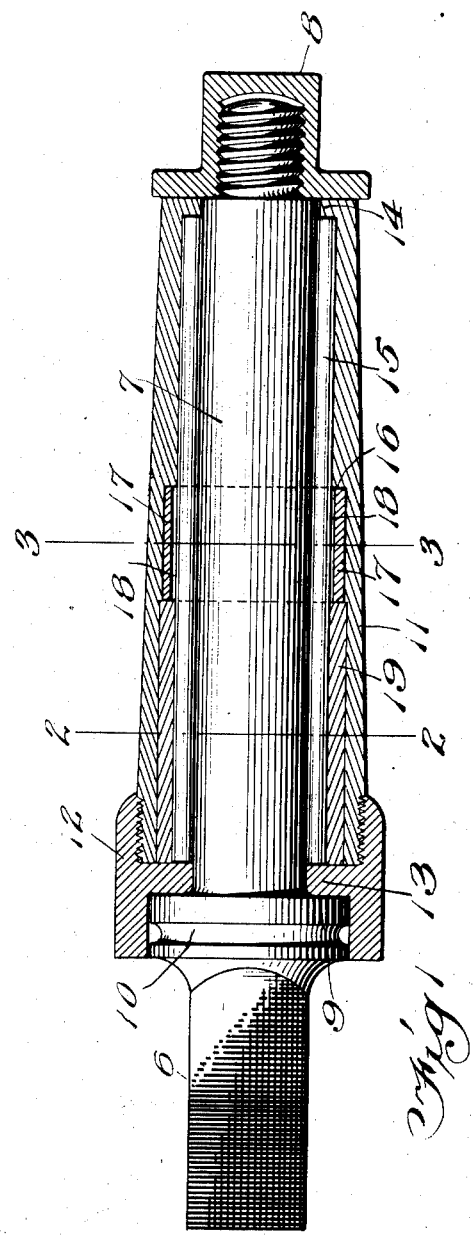
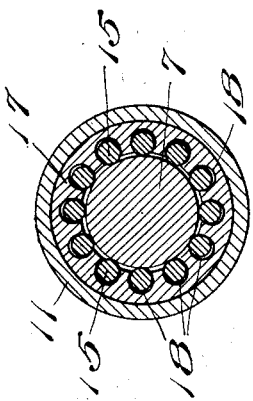
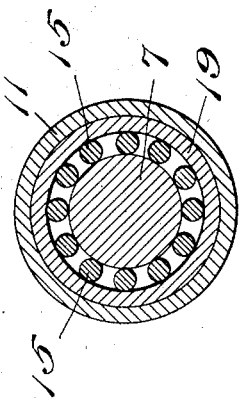
Inventor
Lincoln J. Aldridge.

UNITED STATES PATENT OFFICE.

LINCOLN J. ALDRIDGE, OF PLATTSBURG, NEW YORK, ASSIGNOR TO ALDRIDGE ROLLER BEARING MANUFACTURING COMPANY, A CORPORATION OF NEW YORK.

JOURNAL-BEARING.

No. 927,471.  Specification of Letters Patent.  Patented July 13, 1909.

Application filed October 27, 1908.  Serial No. 459,757.

*To all whom it may concern:*

Be it known that I, LINCOLN J. ALDRIDGE, citizen of the United States, residing at Plattsburg, in the county of Clinton and State of New York, have invented certain new and useful Improvements in Journal-Bearings, of which the following is a specification.

This invention relates to journal bearings, and has for its object to provide an improved anti friction bearing particularly designed for use upon an axle, although capable of use in other places if desired.

The object of the invention is to provide an improved roller bearing, the rollers being in the form of the cylinders which will give a long or wide bearing upon the axle or shaft.

A further object of the invention is to provide improved means for holding the cylinders in spaced position around the bearing, by means of a retainer or spacing ring, as will more fully appear hereinafter.

The parts are so constructed that the bearing may be easily applied, and new rollers can be easily put in place should occasion arise.

Further objects and advantages will appear from the following description and the accompanying drawings.

In the drawings, Figure 1 is a longitudinal section of the bearing as applied to an axle. Fig. 2 is a section on the line 2—2 of Fig. 1. Fig. 3 is a section on the line 3—3 of Fig. 1.

Referring specifically to the drawings, a part of an axle is indicated at 6, and its journal or arm at 7, the latter being threaded at the end to receive a nut 8. The axle has a shoulder 9 with a dust groove 10 around the same. The journal 7 is of uniform diameter throughout.

The axle box or casing comprises a cylindrical shell 11 threaded at its inner end to screw into a ring 12 which has a shoulder 13 which projects inwardly toward the journal, between the shoulder of the axle and the end of the bearings. At its outer end the casing has an inwardly projecting rim 14 which serves to hold the rollers 15 in place at the outer end, the shoulder 13 performing the same service at the inner end.

The wall of the casing or shell is reduced for a portion of its length, at the inner end thereof, forming a shoulder, as indicated at 16, and producing two diameters in the casing. A spacing ring 17 fits within the larger diameter and against the shoulder 16, said ring having a circumferential series of openings 18 through which the rollers 15 extend, or in which they rest. These passages 17 are open on the inner side, so that the rollers may project inwardly beyond the ring and into bearing contact with the journal 7. The larger diameter of the box or casing 11 also receives a cylindrical thimble or bushing 19 which is placed within the box at a close fit, and which occupies the space from the spacing ring 17 to the inner end of the box. The thickness of the bushing 19 equals the depth of the shoulder 16, so that the inner surface of the bushing is flush with the inner surface of the outer end of the box, beyond the spacing ring. The rollers fit between the box so constructed and the journal which is thereby supported on the rollers and is free to rotate in the box with very little friction. The ring 12 holds the thimble in place, as well as the rollers. The spacing ring 17 also acts as a retainer, since the openings through which the rollers extend are somewhat more semi-circular, and consequently the rollers will not fall out laterally even if the journal be removed.

To renew or replace a roller it is only necessary to remove the journal and take off the ring 12. The ends of the rollers are thus exposed, and can be grasped and pulled out endwise, and another roller quickly inserted. The fact that the rollers are retained in position when the journal is removed is particularly advantageous for use on vehicles, in which the wheels often have to be removed from the axle for one purpose or another. The rollers 15 are of the same diameter throughout and are in contact with the journal along their entire length. This gives a very wide and strong bearing and adapts the same for heavy use.

I claim:

A journal bearing comprising a cylindrical casing threaded at its inner end and having an enlarged diameter at the same end, and an inwardly-projecting shoulder at its outer end, a spacer and a bushing fitting within said enlarged part of the casing, rollers held by the spacer and located within the casing and bushing, and a ring screwed on the threaded end of the casing and having an inwardly projecting shoulder at said end, opposite the bushing and the rollers, the latter being retained in place by said shoulders at opposite ends thereof.

In testimony whereof, I affix my signature in presence of two witnesses.

LINCOLN J. ALDRIDGE.

Witnesses:
WILLIAM N. MCINTYRE,
EGBERT C. EVEREST.